US008745109B2

(12) United States Patent
Zhang

(10) Patent No.: US 8,745,109 B2
(45) Date of Patent: *Jun. 3, 2014

(54) APPROXIMATE ORDER STATISTICS OF REAL NUMBERS IN GENERIC DATA

(71) Applicant: Splunk Inc., San Francisco, CA (US)

(72) Inventor: Steve Yu Zhang, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,874

(22) Filed: Oct. 25, 2012

(65) Prior Publication Data

US 2013/0054660 A1 Feb. 28, 2013

Related U.S. Application Data

(63) Continuation of application No. 13/038,085, filed on Mar. 1, 2011.

(51) Int. Cl.
*G06F 17/18* (2006.01)

(52) U.S. Cl.
USPC ........................................................ 708/200

(58) Field of Classification Search
CPC ........................... G06F 17/18; G06F 17/30424
USPC ......................................................... 708/200
See application file for complete search history.

(56) References Cited

U.S. PATENT DOCUMENTS

| 6,108,647 | A | 8/2000 | Poosala et al. |
| 6,728,704 | B2 | 4/2004 | Mao et al. |
| 7,058,540 | B2* | 6/2006 | He et al. .......................... 702/180 |
| 7,149,731 | B2* | 12/2006 | Dettinger et al. ..................... 1/1 |
| 8,301,803 | B2* | 10/2012 | Wegener ........................ 709/247 |
| 2005/0114298 | A1 | 5/2005 | Fan et al. |
| 2006/0248052 | A1* | 11/2006 | Zurek ................................ 707/3 |
| 2007/0162236 | A1 | 7/2007 | Lamblin et al. |
| 2008/0222148 | A1* | 9/2008 | Schreiber ........................... 707/7 |
| 2009/0210467 | A1* | 8/2009 | Iorio ............................... 708/204 |
| 2010/0220783 | A1* | 9/2010 | Mallat et al. ............. 375/240.03 |

OTHER PUBLICATIONS

Tom Parker, Koen Langendoen, Foxtrot: phase space data representation for correlation-aware aggregation, IEEE, 2007, pp. 353-360.*

(Continued)

*Primary Examiner* — Chuong D Ngo
*Assistant Examiner* — Kevin G Hughes
(74) *Attorney, Agent, or Firm* — Hickman Palermo Truong Becker Bingham Wong LLP; Kirk D. Wong

(57) ABSTRACT

A method, system, and processor-readable storage medium are directed towards calculating approximate order statistics on a collection of real numbers. In one embodiment, the collection of real numbers is processed to create a digest comprising hierarchy of buckets. Each bucket is assigned a real number N having P digits of precision and ordinality O. The hierarchy is defined by grouping buckets into levels, where each level contains all buckets of a given ordinality. Each individual bucket in the hierarchy defines a range of numbers—all numbers that, after being truncated to that bucket's P digits of precision, are equal to that bucket's N. Each bucket additionally maintains a count of how many numbers have fallen within that bucket's range. Approximate order statistics may then be calculated by traversing the hierarchy and performing an operation on some or all of the ranges and counts associated with each bucket.

22 Claims, 8 Drawing Sheets

(56) References Cited

OTHER PUBLICATIONS

John Hershberger, Nisheeth Shrivastava, Subhash Suri, and Csaba D. T'oth, Adaptive Spatial Partitioning for Multidimensional Data Streams, University of California at Santa Barbara, 2004, pp. 1-18.*
International Search Report for International Patent Application No. PCT/US2012/026809 mailed Oct. 12, 2012.
Shrivastava, N. et al., "Medians and Beyond: New Aggregation Techniques for Sensor Networks," SenSys '04, Nov. 3-5, 2004, Baltimore, Maryland, 11 pages.
Official Communication for U.S. Appl. No. 13/038,085 mailed Mar. 28, 2013.
International Preliminary Report on Patentability for PCT Application No. PCT/US2012/026809, mailed Sep. 12, 2013, 6 pages.
Final Office Action of Oct. 10, 2013 for U.S. Appl. No. 13/038,085, 21 pages.

* cited by examiner

APPROXIMATE ORDER STATISTICS OF REAL NUMBERS IN GENERIC DATA

CROSS-REFERENCE TO RELATED APPLICATIONS

The present application is a Continuation of U.S. application Ser. No. 13/038,085 filed Mar. 1, 2011, entitled "APPROXIMATE ORDER STATISTICS OF REAL NUMBERS IN GENERIC DATA," the benefit of the earlier filing date of which is hereby claimed under 35 U.S.C. §120 and b37 C.F.R. §1.78, and which is further incorporated by reference.

TECHNICAL FIELD

The present invention relates generally to reducing processing and memory resources used to calculate approximate order statistics of real numbers, and more particularly, but not exclusively, to distributed calculation of approximate order statistics of real numbers.

TECHNICAL BACKGROUND

An increasing number of computing applications, particularly within the enterprise, entail analyzing distributed data. There various ways in which data may be partitioned for distributed analysis. Algorithms may explicitly partition data into multiple chunks, as is common in "divide and conquer" algorithms. Alternatively, data may originate in a distributed manner. For example, data may originate from user uploads to an array of computing nodes, such as pictures posted to a social networking site running in a server farm. In another example, data may be event data obtained by monitoring and recording events that occur on each of a plurality of computing nodes. Such events may include, for example disk accesses, network traffic, application events, etc.

Distributed data may be analyzed to identify trends, generate reports, search for specific records, etc. Often, such data analysis includes the calculation of order statistics on a collection of real numbers. One type of order statistic is the quantile of a number, such as the median or the nth percentile. Quantiles may be used to answer the question "what test score is greater than 90% of all other test scores". Quantiles may also be used to answer the question "what is the percentile rank of this given test score"? Other examples of order statistics include a most frequent data value such as a consensus value, a histogram of data distribution, and range queries.

One way to calculate exact order statistics is to sort the collection of numbers. Then, for example, the median may be found by iterating halfway through the sorted list. However, this method becomes prohibitively expensive in terms of memory usage and computation time for very large data sets. A better method would be to store only unique numbers and the count for each unique number. However, even this improved method becomes impractical when the cardinality of the data set is high; that is, when there are many distinct values, which is very common for numerical data. Moreover, distributing these calculations does not alleviate the problem of the prohibitively large data set, because the results of each distributed calculation must still be combined on a single computing node before order statistics can be inferred.

One method of calculating approximate order statistics is to divide a range of numbers into sub-ranges, count how many numbers fall within each sub-range, and derive order statistics from the counts. However, such techniques provide no bound on the amount of error in the approximation. Accordingly, calculating approximate order statistics in a time and resource efficient manner while minimizing error is an ongoing challenge.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the described embodiments, reference will be made to the following Detailed Description, which is to be read in association with the accompanying drawings, wherein.

DETAILED DESCRIPTION

Figure 1:
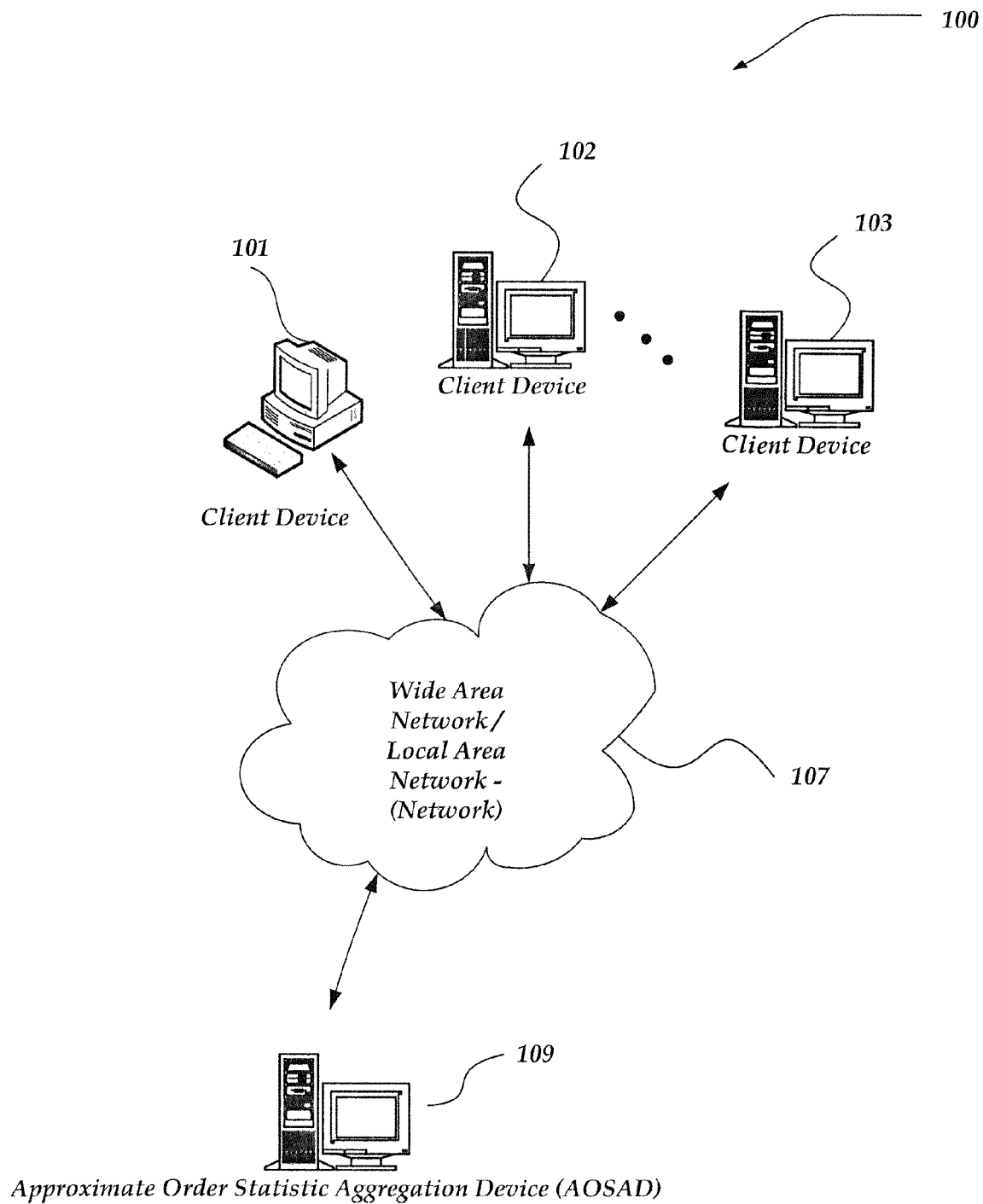
FIG. 1 illustrates a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "event data" refers to computing data that is collected about an event for a computing system, including, for example, an action, characteristic, condition (or state) of the computing system. For example, such events may be about a computing system's performance, actions taken by the computing system, or the like. Event data may be obtained from various computing log files generated by the computer's operating system, and/or other monitoring application. However, event data is not restricted by a file format or structure from which the event data is obtained.

As used herein, the term "real number" refers to a value that represents a quantity along a continuum, such as 5 (an integer), ¾ (a rational number that is not an integer), 86.2 (a rational number expressed in decimal representation), and π (3.1415926535..., an irrational number). A real number may be expressed in decimal notation (e.g. 86.2) or in exponential notation (e.g. $8.62 \times 10^1$). A real number may be expressed in any base or radix, including base 10, base 16 (hex), base 2 (binary), base 42, and the like.

As used herein, the term "digits of precision" refers to the number of digits in a number to the right of a decimal point. For example, 3.333 has 3 digits of precision. $1.234 \times 10^2$ also has 3 digits of precision, while 99 has 0 digits of precision.

As used herein, the term "string" refers to a sequence of characters. The characters may consist of digits, alphabetic characters, mathematical symbols, or any combination thereof. Characters may be selected from a set of well defined character sets, such as ASCII, ANSI, or UNICODE character sets.

As used herein, the term "digest" refers to a hierarchy of buckets containing information queryable to determine an approximate order statistic. As a hierarchy is constructed, buckets may dynamically be added, removed, or combined. Each bucket defines a range of numbers, and maintains a count of how many numbers have fallen within that bucket's range.

As used herein, the term "ordinality" refers to a size of a range of real numbers. Specifically, for Ordinality n, the size of the range of real numbers is $10^n$. In one embodiment, an ordinality of a number may be used to define a bucket's range. Ordinality is derived from the number of digits of precision of a number and, in the case of a number defined using scientific notation, the exponent. Specifically, the ordinality of a number written in decimal notation is the negative of the number of digits of precision. For example, 86.2 has one digit of precision, and so 86.2 has an ordinality of −1. For a number written in scientific notation ($a \times 10^b$, where a is the 'significand' or 'mantissa' and b is the exponent), the ordinality is the negative of the number of digits of precision of the significand plus the exponent. For example, $8.62 \times 10^1$ also has an ordinality of −1: the significand has 2 digits of precision ('6' and '2'), while the exponent is 1, so the ordinality of $8.62 \times 10^1$ is $-2+1=-1$.

As discussed above, each bucket is assigned a contiguous range of real number values. In one embodiment, the range of real values is defined by a real number, a number of digits of precision, and an ordinality. For example, if a bucket is assigned the number 3.5, then the range of real numbers represented is 3.5000000 . . . to 3.5999999 . . . . However, in another embodiment, ranges may be defined as all numbers that round to a given number, or using any other function that maps contiguous ranges of real numbers to one (or more) real numbers.

For some numbers, the range defined is unambiguous without specifying an ordinality. For example, $8.62 \times 10^1$ has a range of 86.2000000 . . . to 86.29999999 . . . . However, 370 is ambiguous—it could have a range of [370, 371] or [370, 380). In order to know which range is desired, an ordinality must be specified. An ordinality of 0 results in a range of [370, 371), while an ordinality of 1 results in a range of [370, 380). In one embodiment, ordinality is encoded in a scientific notation representation of the number. $3.7 \times 10^2$, which has an ordinality of 1, represents [370, 380), while $3.70 \times 10^2$ has an ordinality of 0, and so represents [370, 371). So, by optionally including extra zeros, the ordinality of a number can be customized. Note that for a given ordinality, there are an infinite number of possible buckets—e.g. 3.3, 33.3, 333.3, 3333.3, . . . all have an ordinality of −1.

In one embodiment, the hierarchy of buckets is constructed such that the children of a parent bucket are each have non-overlapping sub-ranges of the parent bucket's range of real numbers. For example, if a parent bucket has a range of [3.5, 3.6), it may have up to 10 (in a base 10 numbering system) child sub-buckets with ranges such as [3.50, 3.51), [3.51, 3.52), . . . , [3.59, 3.60).

Briefly described is a mechanism for calculating approximate order statistics on a collection of real numbers. In one embodiment, the collection of real numbers is processed to create a digest comprising hierarchy of buckets. Each bucket is assigned a real number N having P digits of precision and ordinality O. The hierarchy is defined by grouping buckets into levels, where each level contains all buckets of a given ordinality. Each individual bucket in the hierarchy defines a range of numbers—all numbers that, after being truncated to that bucket's P digits of precision, are equal to that bucket's N. Each bucket additionally maintains a count of how many numbers have fallen within that bucket's range. Approximate order statistics may then be calculated by traversing the hierarchy and performing an operation on some or all of the ranges and counts associated with each bucket.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 107, client devices 101-103, and Approximate Order Statistic Aggregation Device (AOSAD) 109.

One embodiment of client devices 101-103 is described in more detail below in conjunction with FIG. 2. Generally, however, client devices 101-103 may include virtually any computing device capable of communicating over a network to send and receive information, including a digest containing a hierarchy of buckets, performing various online activities, offline actions, or the like. In one embodiment, one or more of client devices 101-103 may be configured to operate within a business or other entity to perform a variety of services for the business or other entity. For example, client devices 101-103 may be configured to operate as a web server, an accounting server, a production server, an inventory server, or the like. However, client devices 101-103 are not constrained to these services and may also be employed, for example, as an end-user computing node, in other embodiments. Further, it should be recognized that more or less client devices may be included within a system such as described herein, and embodiments are therefore not constrained by the number or type of client devices employed.

The set of such devices may include devices that typically connect using a wired or wireless communications medium such as personal computers, servers, multiprocessor systems, microprocessor-based or programmable consumer electronics, network PCs, or the like. In one embodiment, at least some of client devices 101-103 may operate over wired and/or wireless network. In some embodiments, client devices 101-103 may include virtually any portable computing device capable of receiving and sending a message over a network, such as network 107.

Client devices 101-103 also may include at least one other client application that is configured to capture and record event data and/or related metadata. However, the client application need not be limited to merely providing event data and related metadata, and may also provide other information, and/or provide for a variety of other services, including, for example, monitoring for events within and/or between client devices.

The client application may further provide information that identifies itself, including a type, capability, name, and the like. Such information may be provided in a network packet, or the like, sent between other client devices, AOSAD 109, or other computing devices.

Network 107 is configured to couple network devices with other computing devices, including AOSAD 109 and client devices 101-103. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiments, network 107 may be further configurable as a wireless network, which may further employ a plurality of access technologies including 2nd (2G), 3rd (3G), 4th (4G) generation radio access for cellular systems, WLAN, Wireless Router (WR) mesh, and the like. In one non-limiting example, network 107, when configured as a wireless network, may enable a radio connection through a radio network access such as Global System for Mobile communication (GSM), General Packet Radio Services (GPRS), Enhanced Data GSM Environment (EDGE), Wideband Code Division Multiple Access (WCDMA), and the like.

AOSAD 109 includes virtually any network device usable to receive and/or analyze digests from client devices 101-103. AOSAD 109 may, for example, be configured to merge the received digests into a single digest from which approximate order statistics can be calculated.

Devices that may operate as AOSAD 109 include various network devices, including, but not limited to personal computers, desktop computers, multiprocessor systems, microprocessor-based or programmable consumer electronics, network PCs, server devices, network appliances, and the like.

Although FIG. 1 illustrates AOSAD 109 as a single computing device, the invention is not so limited. For example, one or more functions of the AOSAD 109 may be distributed across one or more distinct network devices. Moreover, AOSAD 109 is not limited to a particular configuration. Thus, in one embodiment, AOSAD 109 may contain a plurality of network devices to perform digest aggregation and calculation of approximate order statistics therefrom. Similarly, in another embodiment, AOSAD 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
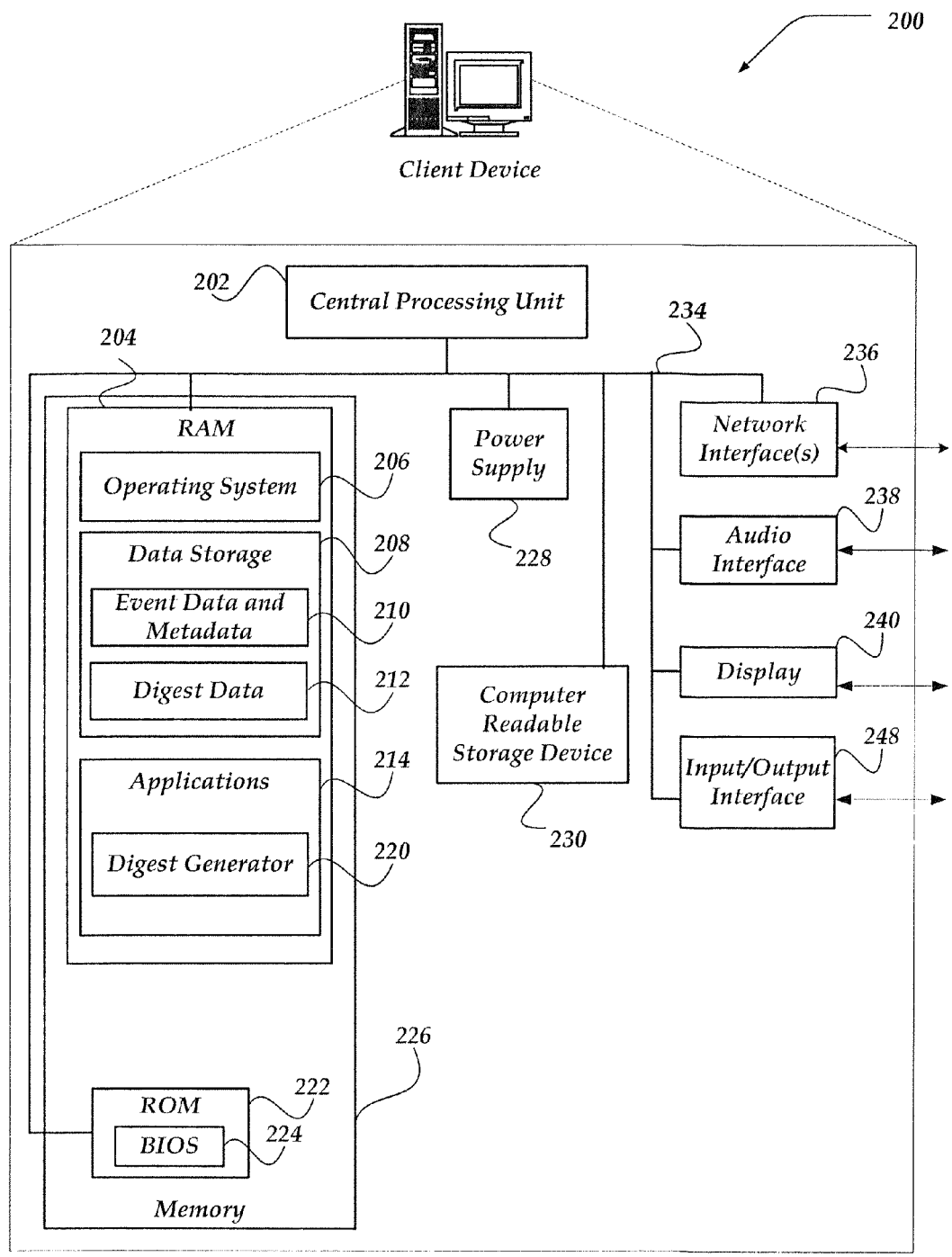
FIG. 2 illustrates an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-103 of FIG. 1.

As shown in the figure, client device 200 includes processing unit (CPU) 202 in communication with a mass memory 226 via a bus 234. Client device 200 also includes a power supply 228, one or more network interfaces 236, an audio interface 238, a display 240, and an input/output interface 248. Power supply 228 provides power to client device 200.

Network interface 236 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Client device 200 also comprises input/output interface 248 for communicating with external devices, such as a keyboard, or other input or output devices not shown in FIG. 2. Input/output interface 248 can utilize one or more communication technologies, such as USB, infrared, Bluetooth™, or the like.

Mass memory 226 includes a RAM 204, a ROM 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device 230 within client device 200. Data storage 208 may further store event data and metadata 210 and digest data 212. Such event data and metadata 210 and digest data 212 may also be stored within any of a variety of other computer-readable storage devices, including, but not limited to a hard drive, a portable storage device, or the like, such as illustrated by computer-readable storage device 230.

Applications 214 may include computer executable instructions which, when executed by client device 200, transmit, receive, and/or otherwise process network data. Other examples of application programs include calendars, search programs, email clients, IM applications, SMS applications, VOIP applications, contact managers, task managers, transcoders, database programs, word processing programs, security applications, spreadsheet programs, games, search programs, data log recording programs, and so forth. Applications 214 may include, for example, digest generator 220. Digest generator 220 may process event data stored in event data and metadata 210, in real time or in a batch, to generate a digest such as digest data 212 usable to calculate approximate order statistics. In one embodiment, the digest data 212 may be sent to AOSAD 109 based on a request from AOSAD 109, or other network device.

Illustrative Network Device

Figure 3:
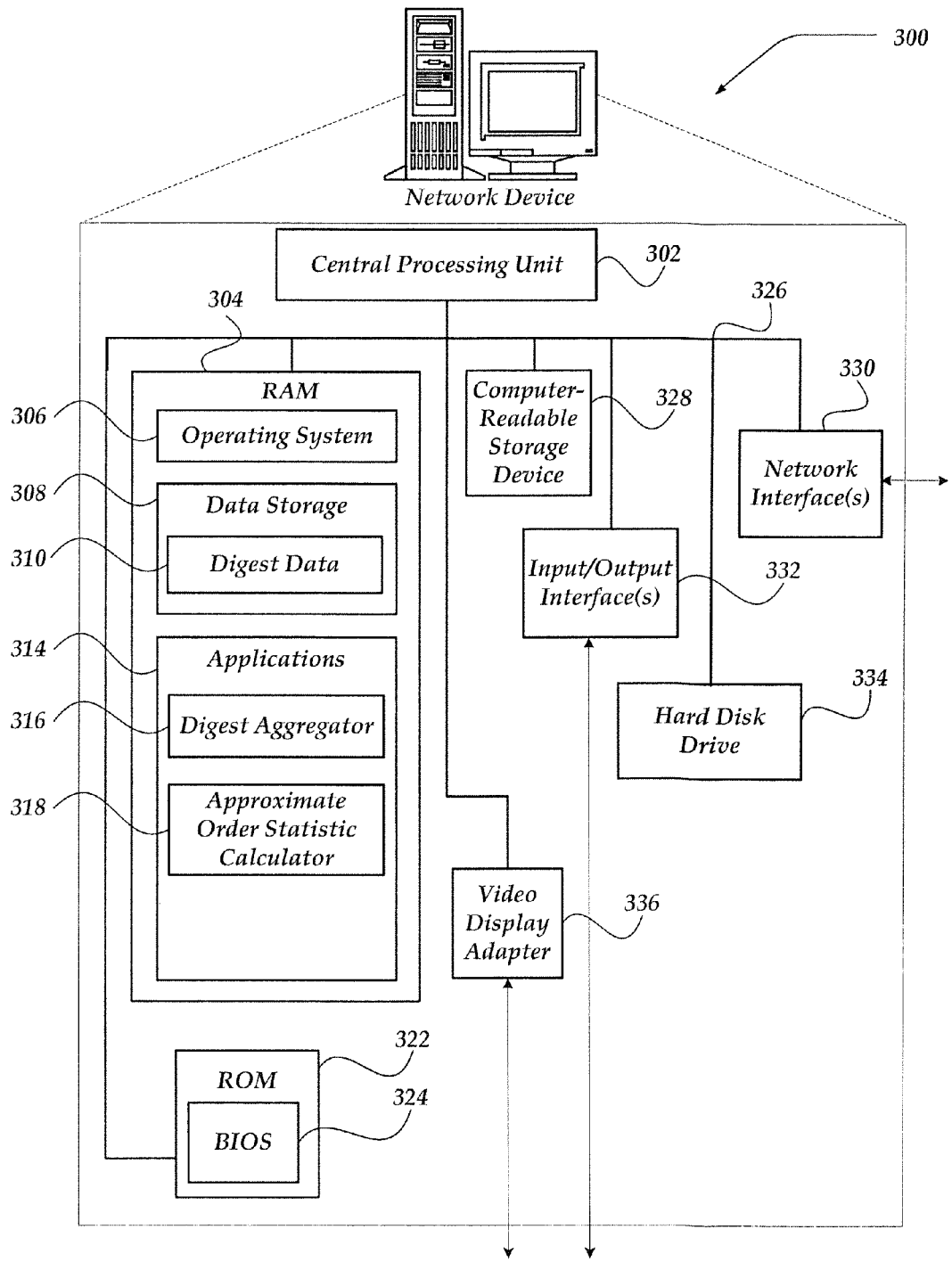
FIG. 3 illustrates an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example OASAD 109 of FIG. 1.

Network device 300 includes processing unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit (CPU) 302 to execute and perform actions. In one embodiment, at least some of data store 308 might also be stored on another component of network device 300, including, but not limited to computer-readable storage medium 328, hard disk drive 334, or the like. Data storage 308 may further store digest data 310.

Digest data 310 may include a hierarchy of buckets as define herein usable to calculate approximate order statistics. In one embodiment, digest data 310 includes individual digests received from another network device, such as client device 200 of FIG. 2. Additionally or alternatively, digest data 310 may include an aggregation of digests.

The mass memory also stores program code and data. One or more applications 314 are loaded into mass memory and run on operating system 306. Examples of application programs may include transcoders, schedulers, calendars, database programs, word processing programs, HTTP programs, customizable user interface programs, IPSec applications, encryption programs, security programs, SMS message servers, account managers, and so forth. Digest aggregator 316 and approximate order statistic calculator 318 may also be included as application programs within applications 314.

Data aggregator 316 may include virtually any computing component or components configured and arranged to aggregate disparate digests into a single digest. In one embodiment, Data aggregator 316 may periodically receive digests from devices such as client devices 101-103. Additionally or alternatively data aggregator 316 may receive a digest created by network device 300. In one embodiment digests are incrementally merged as they are received. In another embodiment, digests are stored until a user request to calculate approximate order statistics is received, at which time the digests are merged.

Approximate order statistic calculator 318 may be configured and arranged to query a digest to calculate an approximate order statistic. In one embodiment, the approximate order statistic calculator 318 may determine the nth percentile rank of a number by adding the counts of all buckets in the digest that have ranges less than the number.

Generalized Operation

Figure 4:
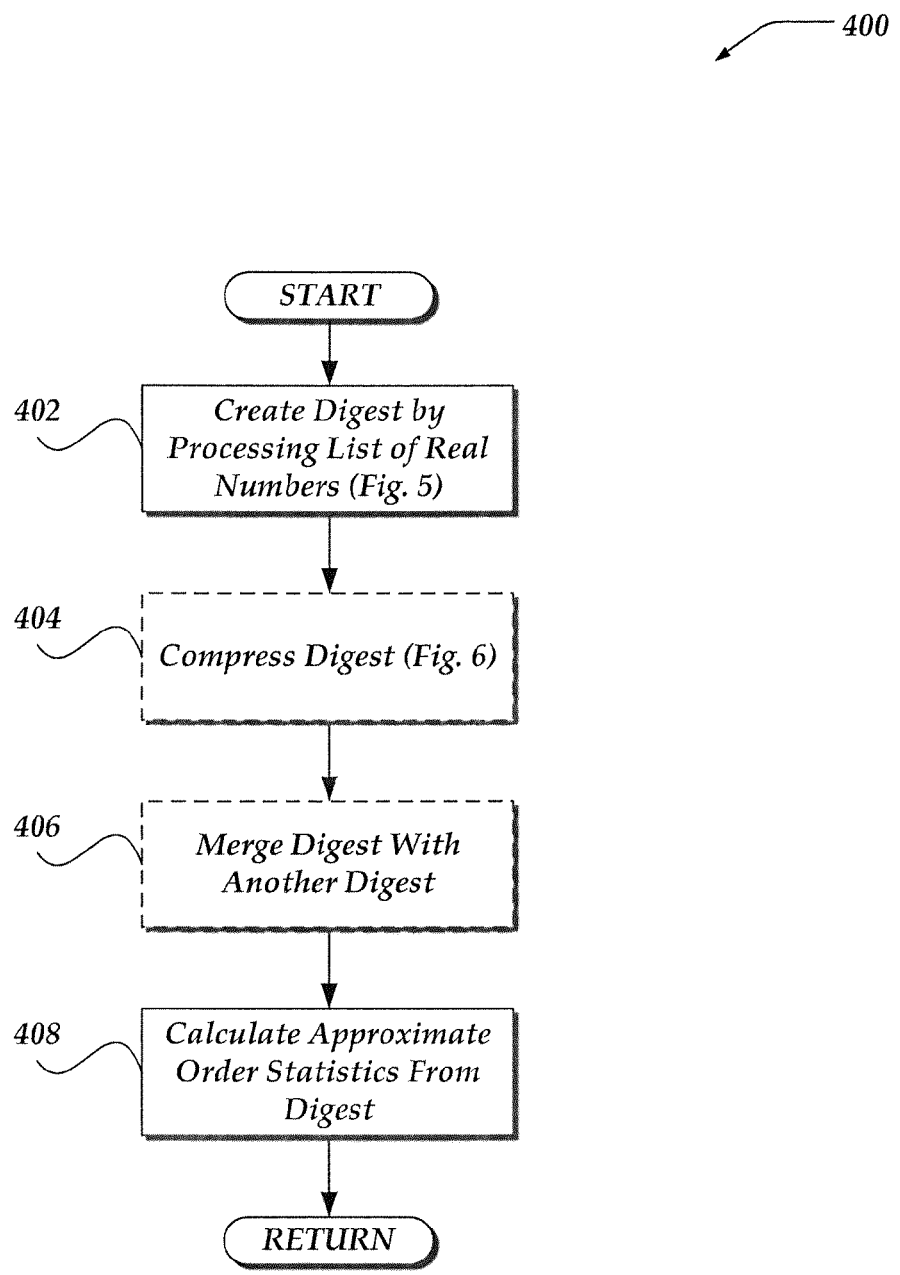
FIG. 4 illustrates a logical flow diagram generally showing one embodiment of an overview of a process for calculating an approximate order statistic of real numbers.
Figure 5:
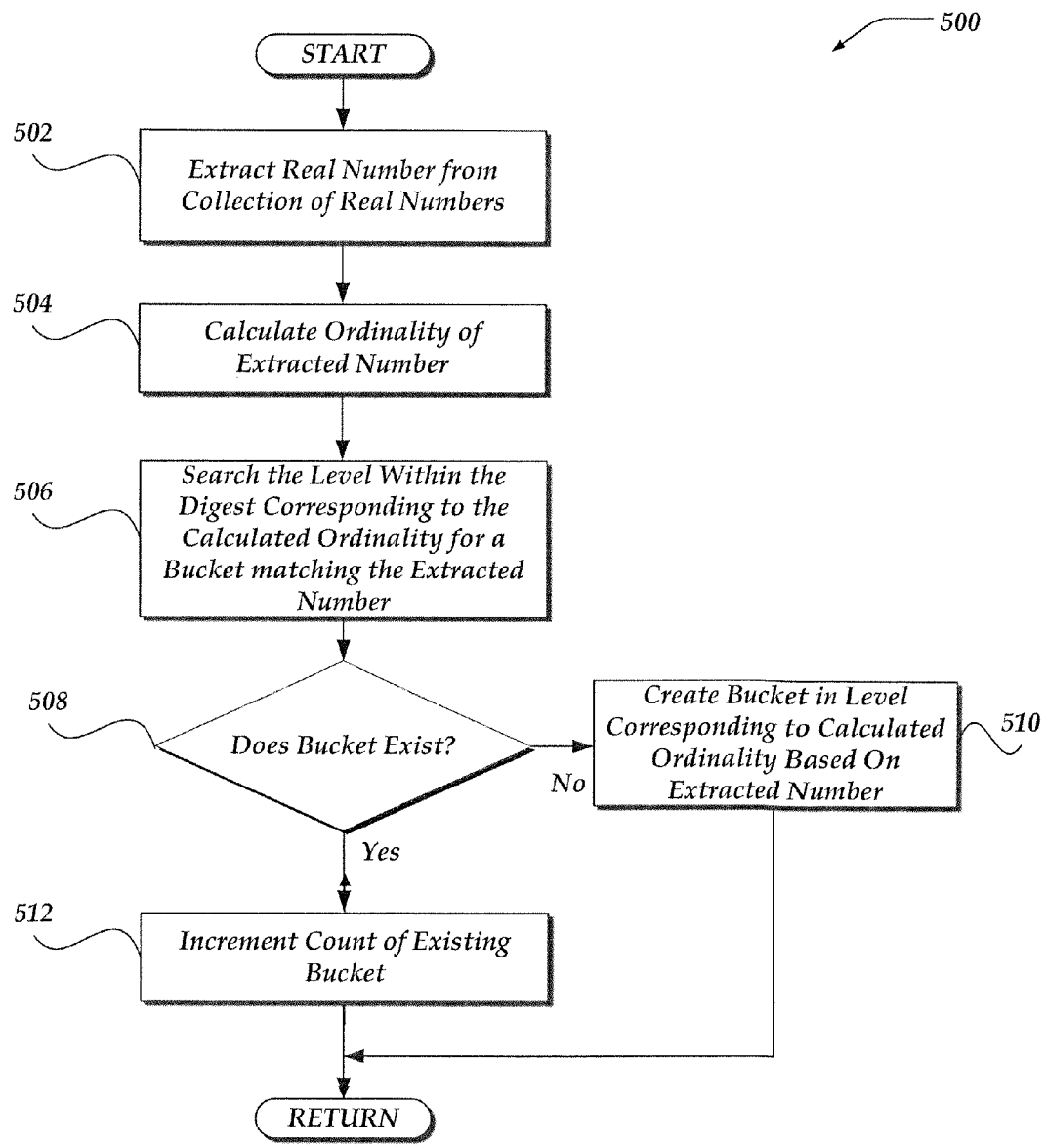
FIG. 5 illustrates a logical flow diagram generally showing one embodiment of a process for adding a number to a digest.
Figure 6:
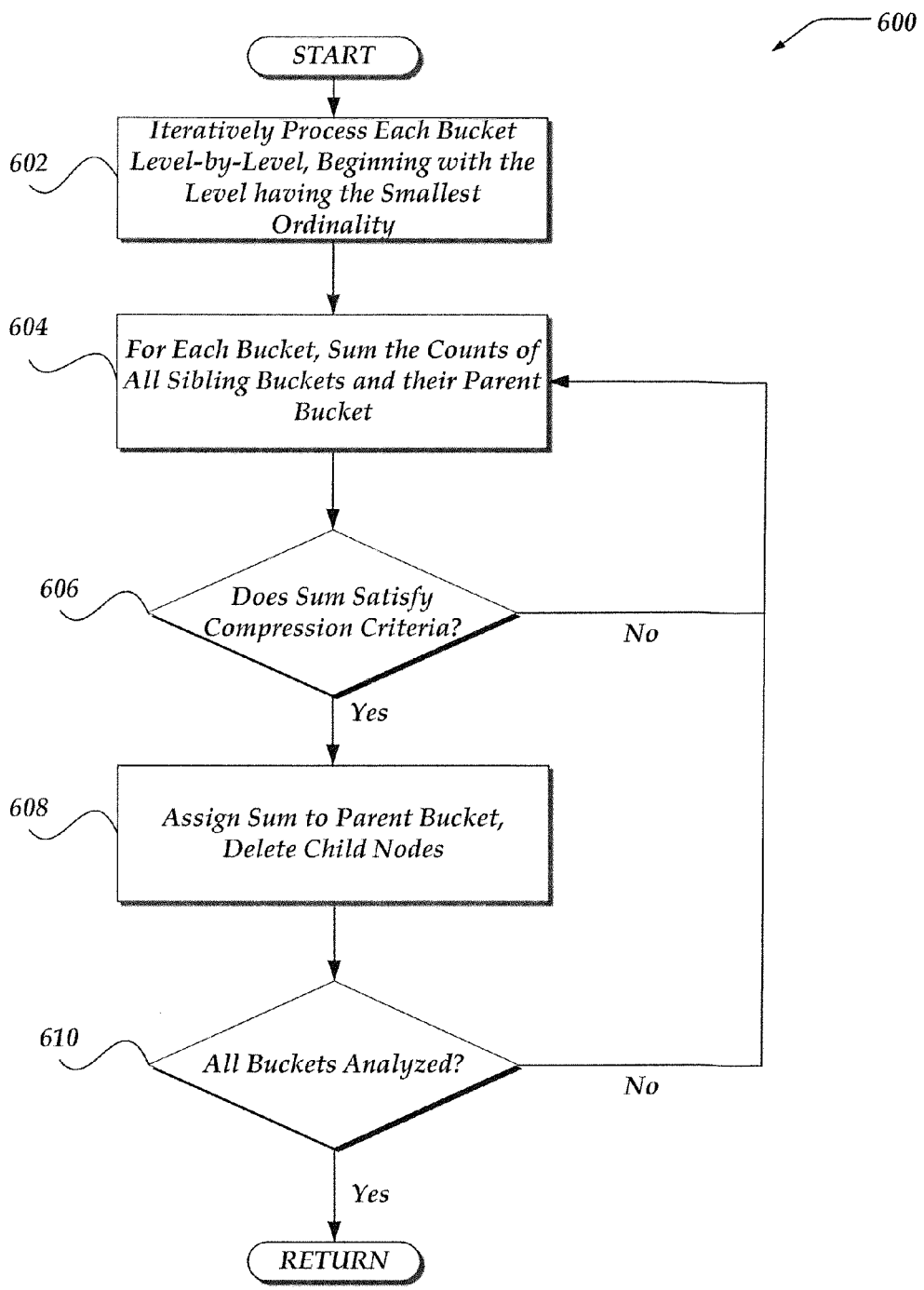
FIG. 6 illustrates a logical flow diagram generally showing one embodiment of a process for compressing a digest.

The operation of certain aspects will now be described with respect to FIGS. 4-7. FIGS. 4-6 provide logical flow diagrams illustrating certain aspects, while FIGS. 7A-7D illustrate a digest as it is compressed. FIG. 4 illustrates a logical flow diagram generally showing one embodiment of a process for calculating approximate order statistics. In one embodiment, process 400 may be implemented any of client devices 101-103 or AOSAD 109.

Process 400 begins, after a start block, at block 402, where a digest is created as a result of processing a list of real numbers. Details of the creation of the digest are described in more detail below in conjunction with FIG. 5.

At block 404, the digest is optionally compressed. Details of compression of a digest are described in more detail below in conjunction with FIG. 6. A digest may be compressed one or many times, periodically as numbers are added to the digest and/or once the digest is complete. Similarly, a digest may be compressed before or after being merged with another digest.

At block 406, the digest is optionally merged with another digest. In one embodiment the other digest may be independently calculated from a separate collection of real numbers. In one embodiment the other digest may itself be the result of a merger of one or more digests.

In one embodiment two digests are merged by copying buckets from a first digest into a second digest. If a bucket from the first digest has a number not represented by a bucket in the second digest, then the first bucket is simply added to the second digest. However, if the bucket from the first digest does have a matching bucket in the second digest, then the count from the first bucket is added to the count of the second bucket. In one embodiment, when one or more digests are merged, the merged digest stores a total number of real number that have been added to each of the digests being merged.

At block 408, an approximate order statistic is calculated based on the digest. In one embodiment, an nth order statistic is calculated, such as determining what percentage of numbers are less than a given number X.

In one embodiment, determining what percentage of numbers are less than a given number X may be calculated by summing the counts of buckets containing numbers less than X and dividing by the total number of numbers N added to the digest. In one embodiment, the percentage may be calculated by summing the counts of buckets containing numbers strictly less than X. This method avoids buckets that may include numbers greater than X. However, in another embodiment, the percentage may be calculated by summing the counts of buckets containing numbers strictly less than X and buckets that may contain X, and dividing by the total number of buckets. Alternatively, the two methods may be averaged or otherwise combined to generate a third measure. The process then terminates at a return block.

FIG. 5 illustrates a logical flow diagram generally showing one embodiment of a process for adding a number to a digest. In one embodiment, process 500 may be executed repeatedly to add many numbers to a digest. In one embodiment, process 500 may be implemented by OASAD 109, one of client devices 101-103, or any other computing device.

Process 500 begins, after a start block, at block 502, by extracting a real number from a collection of real numbers. In one embodiment the collection of real numbers comprises a collection of untyped (raw) string data, while in other embodiments the collection of real numbers comprises a collection of integers, single precision floating point numbers, double precision floating point numbers, and the like. In one embodiment, real numbers represented by untyped string data are not limited to numbers that can be expressed in binary—rather any real number may be completely represented.

If the collection of real numbers comprises a collection of untyped string data, real numbers may be encoded in a number of ways. In one embodiment, a real number may be encoded in a decimal notation, such as "34.7" or "22". Real numbers may also be encoded in scientific notation, such as "2.4×10$^2$", "2.4×10^2", "2.4E2", and the like. Real numbers may also be encoded in another base (radix), such as hexadecimal, e.g. "0x1EA7BEEF".

Regardless of the format in which a number is stored, or in the case of untyped string how it is encoded, the number is converted to a standard scientific notation consisting of a mantissa and an exponent. For example, "34.7" may be represented as "3.47×10$^1$". In one embodiment, if a number from the collection of real numbers includes one or more trailing zeros to the right of the decimal place, these zeros are maintained in the converted representation. For example, "34.700" may be converted to "3.4700×10$^1$". In this way, the ordinality of a number may be determined from the string input. If in any case the ordinality of a number in the string input is ambiguous, such as for the number "370", then in one embodiment an ordinality defining the narrowest range of numbers (e.g. 0) is selected.

At block 504, an ordinality of the extracted number is calculated. In one embodiment the ordinality, as defined above, is calculated as the negative of the number of digits of precision plus, if the number is represented in scientific notation, the exponent. For example, "37.2" would be represented as "3.72×10$^1$", which has two digits to the right of the decimal place ('7' and '2') and an exponent of 1. Thus the ordinality is $(-2)+1=-1$. However, if trailing zeros are included in the source number, such as "37.200", then ordinality is −3: "37.200" is represented as "3.7200×10$^1$", which as four digits to the right of the decimal place ('7', '2', '0', and '0') with an exponent of 1, and $(-4)+1=-3$.

Processing next continues to block 506, where the level in the digest corresponding to the ordinality of the extracted number is searched for a bucket having the extracted number. For example, if the extracted number "37.24" has an ordinality of −2, then the level within the digest containing all buckets with an ordinality of −2 are searched for a bucket containing "3.724×10$^1$" (the equivalent of "37.24"). Processing next continues to decision block 508, where, in one embodiment, if such a bucket is found, processing continues to block 512 where the count of the matching bucket is incremented. If not, processing proceeds to block 510, where a new bucket is created with count set to 1.

FIG. 6 illustrates a logical flow diagram generally showing one embodiment of a process for compressing a digest. In one embodiment, process 600 may be implemented by OASAD 109, one of client devices 101-103, or any other computing device.

Process 600 begins, after a start block, at block 602, where buckets from the level of the digest containing the lowest ordinality of buckets are processed first. Once the level associated with the lowest ordinality buckets has been processed, the level associated with the next-lowest ordinality is processed, and so on until all buckets have been processed.

Processing next continues to block 604, where the sum of the counts of a particular bucket, its siblings, and its parent is calculated. In one embodiment, the parent-child relationship is defined implicitly by the fact that a child's range is a sub-set of a parent's range. Thus, to find a parent bucket given a child bucket having ordinality n, search the level containing buckets with ordinality n+1 for a bucket having a range that includes the child bucket's range. In one embodiment, only immediate siblings and the immediate parent are included in the sum, while in other embodiments grandparent buckets, child buckets, and the like may also be included. Also, while a non-weighted sum may be used, in other embodiments a weighted sum may be calculated where the particular bucket, the parent bucket, or one or more sibling buckets may be weighted more or less than each other. In one embodiment, particular digits may be weighted differently, or particular digits at particular orders of magnitude may be weighted differently. For example, if historical analysis indicates some digits are more common than others, buckets containing a number that ends in one of the more common digits may be weighted more, such that these buckets are less likely to be collapsed during a compression.

Processing next continues to decision block 606, where a determination is made whether the sum calculated in block 604 satisfies a compression criteria. In one embodiment, the compression criteria is met if the sum calculated in block 604 is less than or equal to Floor(N/K), where N=the number of real numbers processed into the digest so far, K is a configurable constant, and "Floor" is a mathematical function that truncates a number to the greatest integer less than or equal to that number. For example, Floor(6.99)=6. If the compression criteria is met, processing continues to block 608. If not, processing continues to block 604 to analyze another bucket.

Configurable constant K may be used to balance the accuracy of the digest with the amount of memory used to store the digest. In one embodiment, a smaller K results in a more frequent compressions, thus reducing the memory required to store the digest. However, as a greater number of child buckets and their siblings are collapsed into their parent buckets, the accuracy of order statistics generated is reduced.

Processing continues to block 608, where a node is collapsed into it's parent, thereby compressing the digest. In one embodiment a bucket is collapsed by adding the counts of the bucket, all of its siblings, and of its parent. The resulting sum is then assigned to the count of the parent, while the bucket and it's siblings are deleted.

Processing continues to decision block 610, where a determination is made if all buckets in the digest have been processed. If all buckets in the digest have been processed, processing continues to a return block. If buckets remain to be processed, processing continues to block 604. In one embodiment, all buckets at a lowest level are processed first, followed by all buckets at a next lowest level, and so on. However, other orders are also considered, including a top-down order, a random order, a depth/breadth-first first traversal, and the like.

FIGS. 7A-7D illustrate a sequence in which a digest is compressed. Each block represents a bucket, where the bucket's number is expressed in scientific notation (e.g. $3.7 \times 10^3$), while the bucket's count follows in parenthesis (e.g. (3)). Dotted lines represent a parent-child relationship.

Figure 7A:
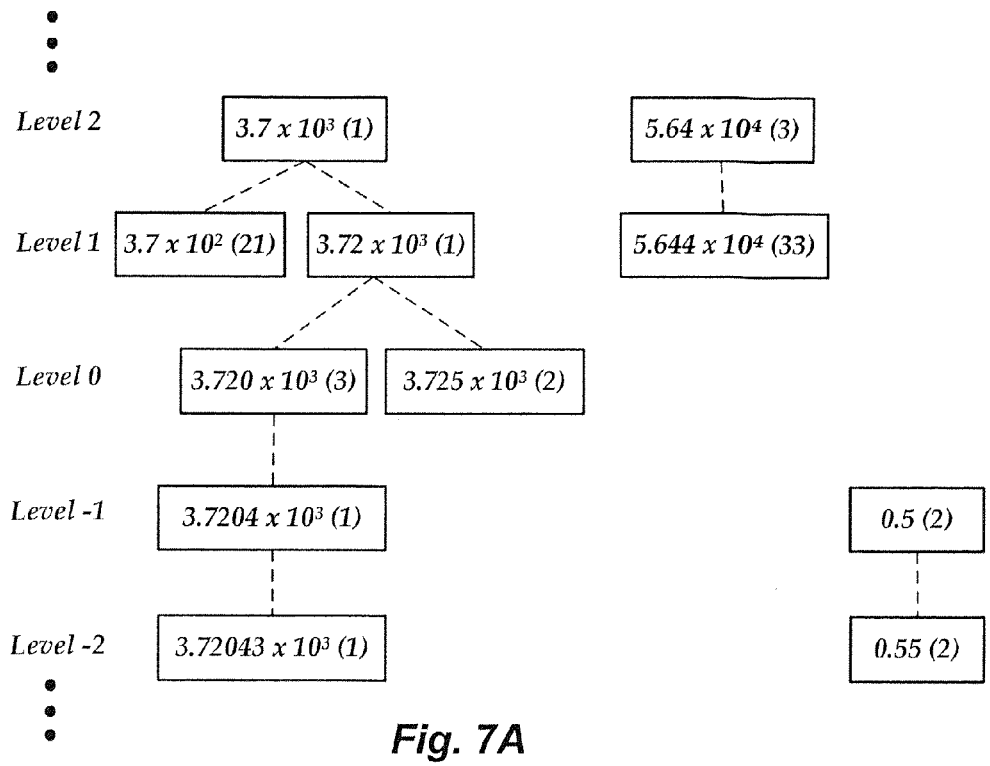
FIGS. 7A-7D illustrate a digest in various stages of compression.

Beginning with FIG. 7A, three hierarchies within the digest exist—two rooted in level 2, $3.7 \times 10^3$ and $5.64 \times 10^4$ and 0.5 at level −1. Note that both $3.7 \times 10^3$ and $5.64 \times 10^4$ have an ordinality of 2, which is why they are found in level 2, while 0.5 has an ordinality of −1. Assume, for this example, that the digest contains N=70 buckets, and that the configurable constant K=15.

Figure 7B:
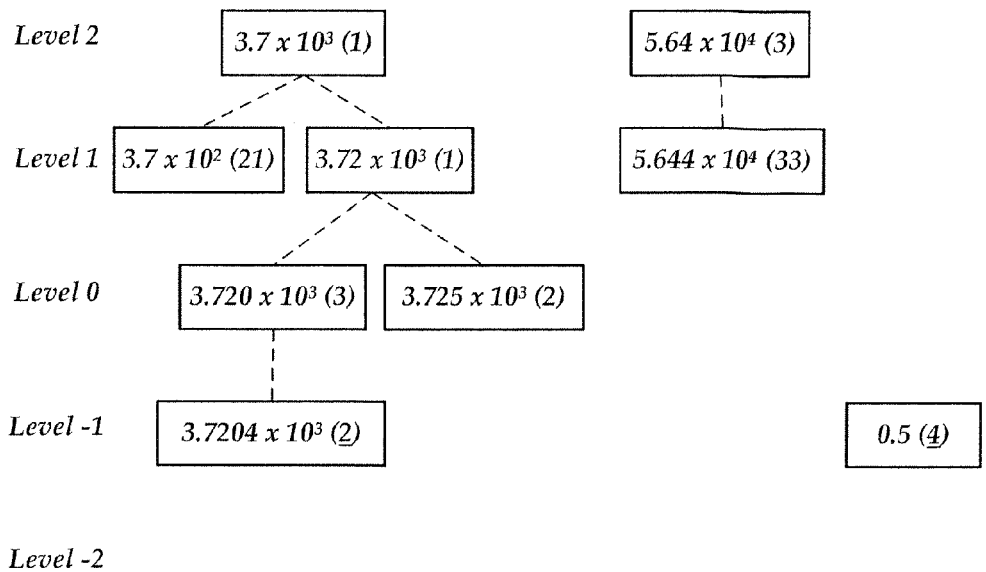

FIG. 7B illustrates the digest after the lowest level (−2) of buckets has been compressed. In this case, both of the buckets in level −2 have been collapsed into their respective parents. The bucket having value $3.72043 \times 10^3$ and it's parent ($3.7204 \times 10^3$) had a collective count of 2. Floor(N/K)=Floor(70/15)=5. 2 is less than 5, and so $3.72043 \times 10^3$ is collapsed into $3.7204 \times 10^3$. Similarly, 0.55 collapses into 0.5.

Figure 7C:
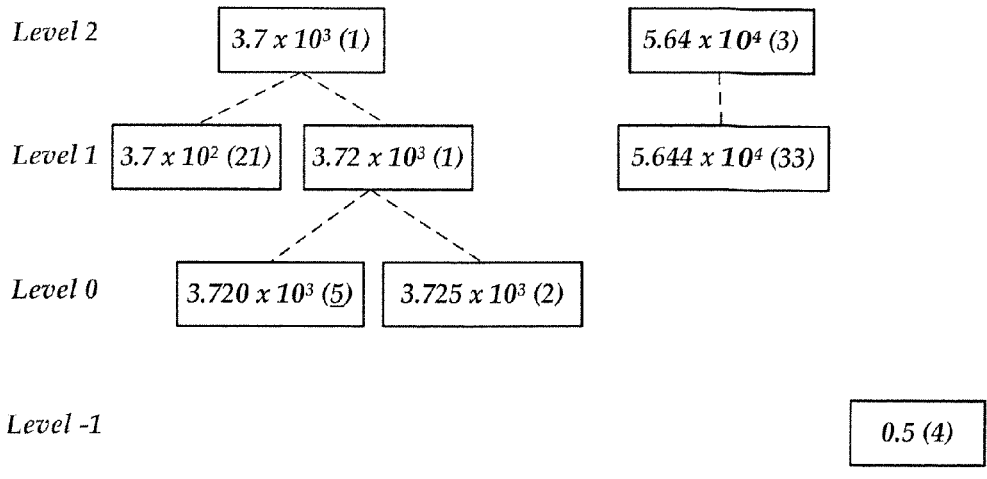
Figure 7D:
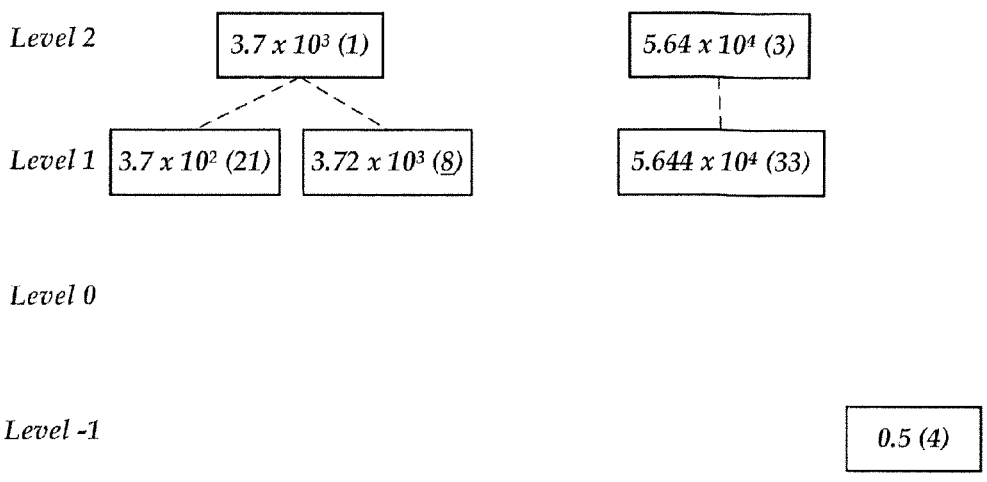

FIG. 7C illustrates the digest after level −1 has been compressed. The $3.7204 \times 10^3$ node has collapsed into it's parent, while the 0.55 node, which has no parent, remains. Finally, FIG. 7D illustrates the digest after level 0 has been compressed. No further compression is achievable from the state of the digest in FIG. 7D for the given K value.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. These program instructions may be stored on a computer readable medium or machine readable medium, such as a computer readable storage medium.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

Approximate order statistics may be included in a report, graph, timeline, or other representation of information displayed on a physical device. Also, approximate order statistics may be used to trigger events such as turning on devices, throttling traffic, alerting an administrator, or the like.

The above specification, examples, and data provide a complete description of the manufacture and use of the composition of the described embodiments. Since many embodiments can be made without departing from the spirit and scope of this description, the embodiments reside in the claims hereinafter appended.

What is claimed as new and desired to be protected by Letters Patent of the United States is:

1. A method for calculating approximate order statistics from a collection of floating point numbers from a digest in a network comprising:

accessing, by one or more processors, the digest wherein the digest is stored in a non-transitory memory, wherein:

the digest includes a plurality of buckets positioned along a plurality of levels, each level is defined by an ordinality, each bucket of the plurality of buckets is defined by the ordinality of the level along which it is positioned, is further defined by a range limited by one or more extrema, and is associated with a count that reflects a quantity of floating point numbers having an ordinality matching the ordinality of the bucket, and wherein the ordinality of each floating point number is determined by converting the floating point number to a mantissa and an exponent and subtracting a number of significant digits in the mantissa to the right of the decimal point including significant zeros from the exponent, the plurality of buckets includes a parent bucket that is positioned above a plurality of child buckets in a hierarchy in the digest, and the parent bucket has a non-zero count reflecting floating point numbers not reflected in the counts of the plurality of child buckets;

receiving a query value;

identifying, by the one or more processors, a set of buckets from amongst the plurality of buckets, such that either each bucket in the set of buckets is defined by a range below the query value or each bucket in the set of buckets is defined by a range above the query value;

determining, by the one or more processors, a first count sum by summing the counts associated with the set of buckets;

determining, by the one or more processors, a second count sum by summing the counts associated with the plurality of buckets; and estimating, by the one or more processors, an order statistic responsive to the query value based on the first count sum and the second count sum.

2. The method of claim 1, wherein the floating point number includes an untyped string.

3. The method of claim 1, wherein the range of each bucket of the plurality of buckets is implicitly defined based on a precision of a number.

4. The method of claim 1, wherein the count of a bucket of the plurality of buckets reflects the quantity of floating point numbers matching a number defining the bucket.

5. The method of claim 1, further comprising:
merging the digest with another digest.

6. The method of claim 1, further comprising:
compressing the digest by collapsing a bucket, at least one of the bucket's siblings, and the bucket's parent into the bucket's parent when a sum of the counts of the bucket, at least one of the bucket's siblings, and the bucket's parent is less than a number of floating point numbers added to the digest divided by a constant.

7. The method of claim 6, wherein collapsing the bucket, the at least one bucket's siblings, and the bucket's parent includes assigning the sum of the counts of the bucket, the bucket's siblings, and the bucket's parent to the count of the bucket's parent, and deleting each of the bucket and the bucket's siblings.

8. An apparatus for calculating approximate order statistics, comprising:

a processor; and a memory storing instructions that when executed by the processor cause actions to be performed, including:

accessing a digest stored in a non-transitory memory, wherein:

the digest includes a plurality of buckets positioned along a plurality of levels, each level is defined by an ordinality, each bucket of the plurality of buckets is defined by the ordinality of the level along which it is positioned, is further defined by a range limited by one or more extrema, and is associated with a count that reflects a quantity of floating point numbers having an ordinality matching the ordinality of the bucket, and wherein the ordinality of each floating point number is determined by converting the floating point number to a mantissa and an exponent and subtracting a number of significant digits in the mantissa to the right of the decimal point including significant zeros from the exponent, the plurality of buckets includes a parent bucket that is positioned above a plurality of child buckets in a hierarchy in the digest, and the parent bucket is associated with a non-zero count reflecting floating point-numbers not reflected in the counts of the plurality of child buckets;

receiving a query value;

identifying a set of buckets from amongst the plurality of buckets, such that either each bucket in the set of buckets is defined by a range below the query value or each bucket in the set of buckets is defined by a range above the query value;

determining a first count sum by summing the counts associated with the set of buckets;

determining a second count sum by summing the counts associated with the plurality of buckets; and estimating an order statistic responsive to the query value based on the first count sum and the second count sum.

9. The apparatus of claim 8, wherein the floating point number includes an untyped string.

10. The apparatus of claim 8, wherein the range of each bucket of the plurality of buckets is implicitly defined based on a precision of a number.

11. The apparatus of claim 8, wherein the count of a bucket of the plurality of buckets reflects the quantity of floating point numbers matching a number defining the bucket.

12. The apparatus of claim 8, further comprising:
compressing the digest by collapsing a bucket, at least one of the bucket's siblings, and the bucket's parent into the bucket's parent when a sum of the counts of the bucket, at least one of the bucket's siblings, and the bucket's parent is less than a number of floating point numbers added to the digest divided by a constant.

13. The apparatus of claim 12, wherein collapsing the bucket, the at least one bucket's siblings, and the bucket's parent includes assigning the sum of the counts of the bucket, the bucket's siblings, and the bucket's parent to the count of the bucket's parent, and deleting each of the bucket and the bucket's siblings.

14. A non-transitory processor readable storage medium storing instructions that cause a processor to perform actions, comprising:

accessing a digest stored in a non-transitory memory, wherein:

the digest includes a plurality of buckets positioned along a plurality of levels, each level is defined by an ordinality, each bucket of the plurality of buckets is defined by the ordinality of the level along which it is positioned, is further defined by a range limited by one or more extrema, and is associated with a count that reflects a quantity of floating point numbers having an ordinality matching the ordinality of the bucket, wherein the ordinality of each floating point number is determined by converting the floating point number to a mantissa and an exponent and subtracting a number of significant digits in the mantissa to the right of the decimal point including significant zeros from the exponent, the plurality of buckets includes a parent bucket that is positioned above a plurality of child buckets in a hierarchy in the digest, and the parent bucket is associated with a non-zero count reflecting floating point numbers not reflected in the counts of the plurality of child buckets;

receiving a query value;

identifying a set of buckets from amongst the plurality of buckets, such that either each bucket in the set of buckets is defined by a range below the query value or each bucket in the set of buckets is defined by a range above the query value;

determining a first count sum by summing the counts associated with the set of buckets;

determining a second count sum by summing the counts associated with the plurality of buckets; and estimating an order statistic responsive to the query value based on the first count sum and the second count sum.

15. The processor readable storage medium of claim 14, wherein the floating point number includes an untyped string.

16. The processor readable storage medium of claim 14, wherein the range of each bucket of the plurality of buckets is implicitly defined based on a precision of a number.

17. The processor readable storage medium of claim 14, wherein the count of a bucket of the plurality of buckets reflects the quantity of floating point numbers matching a number defining the bucket.

18. The processor readable storage medium of claim 14, the memory contains instructions further causing the processor to perform actions comprising;

merging the digest with another digest.

19. The processor readable storage medium of claim 14, wherein the memory contains instructions further causing the processor to:

compress the digest by collapsing a bucket, at least one of the bucket's siblings, and the bucket's parent into the bucket's parent when a sum of the counts of the bucket, at least one of the bucket's siblings, and the bucket's parent is less than a number of floating point numbers added to the digest divided by a constant.

20. The processor readable storage medium of claim 19, wherein collapsing the bucket, the at least one bucket's siblings, and the bucket's parent includes assigning the sum of the counts of the bucket, the bucket's siblings, and the bucket's parent to the count of the bucket's parent, and deleting each of the bucket and the bucket's siblings.

21. A system comprising:

a first computing device storing a digest derived from a collection of floating point numbers, wherein the digest includes one or more buckets grouped into one or more levels, wherein:

the digest includes a plurality of buckets positioned along a plurality of levels, each level is defined by an ordinality, each bucket of the plurality of buckets is defined by the ordinality of the level along which it is positioned, is further defined by a range limited by one or more extrema, and is associated with a count that reflects a quantity of floating point numbers having an ordinality matching the ordinality of the bucket, and wherein the ordinality of each floating point number is determined by converting the floating point number to a mantissa and an exponent and subtracting a number of significant digits in the mantissa to the right of the decimal point including significant zeros from the exponent, the plurality of buckets includes a parent bucket that is positioned above a plurality of child buckets in a hierarchy in the digest, and the parent bucket is associated with a non-zero count reflecting floating point numbers not reflected in the counts of the plurality of child buckets; and a second computing device configured to perform actions comprising:

receiving the digest;

receiving a query value;

identifying a set of buckets from amongst the plurality of buckets, such that either each bucket in the set of buckets is defined by a range below a query value or each bucket in the set of buckets is defined by a range above the query value;

determining a first count sum by summing the counts associated with the set of buckets;

determining a second count sum by summing the counts associated with the plurality of buckets; and estimating an order statistic responsive to the query value based on the first count sum and the second count sum.

22. The system of claim 21, wherein, for each bucket of the plurality of buckets, the count reflects the quantity of floating point numbers having an ordinality equal to the ordinality of the bucket and having a value within the defined range of the bucket.

* * * * *